United States Patent
Baik et al.

(10) Patent No.: US 10,079,372 B2
(45) Date of Patent: Sep. 18, 2018

(54) SECONDARY BATTERY AND FABRICATING METHOD THEREOF

(71) Applicant: SAMSUNG SDI CO., LTD., Yongin-si, Gyeonggi-do (KR)

(72) Inventors: Yunki Baik, Yongin-si (KR); Taewon Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 51 days.

(21) Appl. No.: 15/197,533

(22) Filed: Jun. 29, 2016

(65) Prior Publication Data

US 2017/0149023 A1   May 25, 2017

(30) Foreign Application Priority Data

Nov. 24, 2015   (KR) .................... 10-2015-0164898

(51) Int. Cl.
| | |
|---|---|
| *H01M 2/02* | (2006.01) |
| *H01M 2/26* | (2006.01) |
| *H01M 10/0587* | (2010.01) |
| *H01M 2/10* | (2006.01) |

(52) U.S. Cl.
CPC ......... *H01M 2/0257* (2013.01); *H01M 2/024* (2013.01); *H01M 2/0217* (2013.01); *H01M 2/0285* (2013.01); *H01M 2/1094* (2013.01); *H01M 2/263* (2013.01); *H01M 10/0587* (2013.01); *H01M 2002/0297* (2013.01)

(58) Field of Classification Search
CPC ..... H01M 10/0587; H01M 2002/0297; H01M 2/0217; H01M 2/024; H01M 2/0257; H01M 2/0285; H01M 2/1094; H01M 2/263; H05K 5/04
See application file for complete search history.

(56) References Cited

U.S. PATENT DOCUMENTS

| | | | |
|---|---|---|---|
| 4,111,328 A | 9/1978 | Eggert et al. | |
| 9,559,384 B2* | 1/2017 | Takahashi | ........... H01M 10/058 |
| 2010/0266878 A1 | 10/2010 | Eilertsen | |
| 2010/0304201 A1* | 12/2010 | Caumont | ............... H01G 11/82 |
| | | | 429/120 |
| 2011/0059352 A1* | 3/2011 | Lee | ..................... H01M 2/0202 |
| | | | 429/164 |

(Continued)

FOREIGN PATENT DOCUMENTS

| | | |
|---|---|---|
| EP | 2528132 A2 | 11/2012 |
| KR | 2000-0061589 A | 10/2000 |

(Continued)

OTHER PUBLICATIONS

EPO Partial Search Report dated Apr. 12, 2017, for corresponding European Patent Application No. 16179649.5 (9 pages).

*Primary Examiner* — Carlos Barcena
(74) *Attorney, Agent, or Firm* — Lewis Roca Rothgerber Christie LLP

(57) ABSTRACT

A secondary battery includes an electrode assembly including a first electrode plate, a second electrode plate, and a separator between the first electrode plate and the second electrode plate, a can accommodating the electrode assembly, and a cap assembly coupled to and sealing the can, wherein a top end and a bottom end of the can each have a thickness that is greater than a thickness of a middle portion of the can.

9 Claims, 6 Drawing Sheets

(56) References Cited

U.S. PATENT DOCUMENTS

| | | | |
|---|---|---|---|
| 2011/0236750 A1 | 9/2011 | Kohno et al. | |
| 2012/0301779 A1* | 11/2012 | Munenaga | H01M 2/024 |
| | | | 429/178 |
| 2016/0204399 A1* | 7/2016 | Suzuki | H01M 2/0217 |
| | | | 429/152 |

FOREIGN PATENT DOCUMENTS

| | | |
|---|---|---|
| KR | 10-2004-0110254 A | 12/2004 |
| KR | 10-2006-0027263 | 3/2006 |
| KR | 10-2007-0056430 A | 6/2007 |
| KR | 10-2007-0097852 A | 10/2007 |

* cited by examiner

SECONDARY BATTERY AND FABRICATING METHOD THEREOF

CROSS-REFERENCE TO RELATED APPLICATION

This application claims priority to and the benefit of Korean Patent Application No. 10-2015-0164898, filed on Nov. 24, 2015 in the Korean Intellectual Property Office, the contents of which are incorporated by reference herein in their entirety.

BACKGROUND

1. Field

Embodiments of the present invention relate to a secondary battery and a fabricating method thereof.

2. Description of the Related Art

Secondary batteries are configured to be discharged and recharged, unlike primary batteries, which are not configured to be rechargeable. Secondary batteries may be of a low capacity type, which includes a single battery cell packaged in the form of a pack typically used for small portable electronic devices, such as cellular phones and camcorders, or a high capacity type, which includes several tens of battery packs connected to one another and is widely used as a power source for driving a motor, such as a motor of a hybrid vehicle, etc.

To avoid or reduce a risk of explosion or fire, the secondary battery is subjected to safety tests including electrical tests, such as short-circuiting, abnormal charging, over-charging, or forced discharging, and tests for stability (e.g., resistance to explosion or ignition of the secondary battery) in a physically unstable situation, such as vibration, falling, or shocks. For example, during a drop or collision test from among various safety tests of secondary batteries, impacts to top and bottom ends of a can are more severe than impacts to a central portion of the can because the top and bottom ends of the can are more prone to deformation. Therefore, there exists a need for a structure for reinforcing the strength of the top and bottom ends of the can.

SUMMARY

Embodiments of the present invention provide a secondary battery and a fabricating method thereof, which can improve heat radiation efficiency while reducing deformation of a can during a drop or collision test.

The above and other aspects of the present invention are described in or will be apparent from the following description of exemplary embodiments.

According to an aspect of embodiments of the present invention, a secondary battery includes an electrode assembly including a first electrode plate, a second electrode plate, and a separator between the first electrode plate and the second electrode plate, a can accommodating the electrode assembly, and a cap assembly coupled to and sealing the can, wherein a top end and a bottom end of the can each have a thickness that is greater than a thickness of a middle portion of the can.

The can may include metal boards having different thicknesses, and the metal boards may be welded together to form a unitary metal board. The unitary metal board may be folded, and end portions of the unitary metal board may be welded together.

The secondary battery may further include a first electrode tab electrically connected to the first electrode plate and downwardly protruding from the electrode assembly, and the first electrode tab may be welded to a bottom surface of the can.

According to another aspect of embodiments of the present invention, a method of fabricating a secondary battery includes forming a can having a top end and a bottom end having respective thicknesses that are greater than a thickness of a middle portion of the can, inserting an electrode assembly into the can, the electrode assembly including a first electrode plate, a second electrode plate, and a separator between the first electrode plate and the second electrode plate, and coupling a cap assembly to the can.

The forming of the can may include welding a first metal board having a first thickness, a second metal board having a second thickness and a third metal board having a third thickness to each other to form a unitary metal board.

The forming of the can may further include folding the unitary metal board, and welding end portions of the unitary metal board that are adjacent to each other after folding.

The first thickness of the first metal board may be the same as the second thickness of the second metal board, and the third thickness of the third metal board may be less than the first and second thicknesses.

The third metal board may be arranged between the first metal board and the second metal board.

The fabricating method may further include welding a first electrode tab to a bottom surface of the can, and the first electrode tab may be electrically connected to the first electrode plate and may protrude downwardly from the electrode assembly.

As described above, in the secondary battery according to one or more embodiments of the present invention, respective thicknesses of a top end and a bottom end of a can are greater than a thickness of a middle portion of the can, thereby reducing or minimizing deformation of the can during a drop or collision test and improving heat radiation efficiency.

In addition, in the method of fabricating the secondary battery according to one or more embodiments of the present invention, metal boards having different thicknesses are welded to each other and are then folded to form the can. Accordingly, the method of fabricating the secondary battery according to one or more embodiments of the present invention may be facilitated. In addition, deformation of the can during a drop or collision test may be reduced or minimized by different strengths at different regions of the can.

BRIEF DESCRIPTION OF THE DRAWINGS

The above and other aspects of the present invention will become more apparent by describing, in detail, exemplary embodiments thereof with reference to the attached drawings, in which.

DETAILED DESCRIPTION

Figure 1:
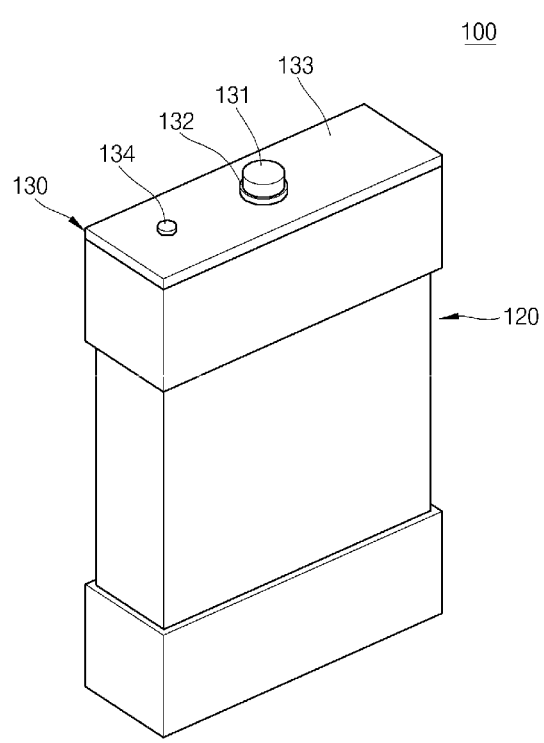
FIG. 1 is a perspective view of a secondary battery according to one or more embodiments of the present invention.

Hereinafter, examples of embodiments of the present invention are described in detail with reference to the accompanying drawings such that they can easily be made and used by those skilled in the art. The present invention, however, may be embodied in various different forms and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "bottom," "above," "upper," "top," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on" or "connected to" another element or layer, it can be directly on or connected to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components but do not preclude the presence or addition of one or more other features, integers, steps, operations, elements, components, and/or groups thereof. As used herein, the term "and/or" includes any and all combinations of one or more of the associated listed items.

As used herein, the terms "substantially," "about," and similar terms are used as terms of approximation and not as terms of degree and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Figure 2:
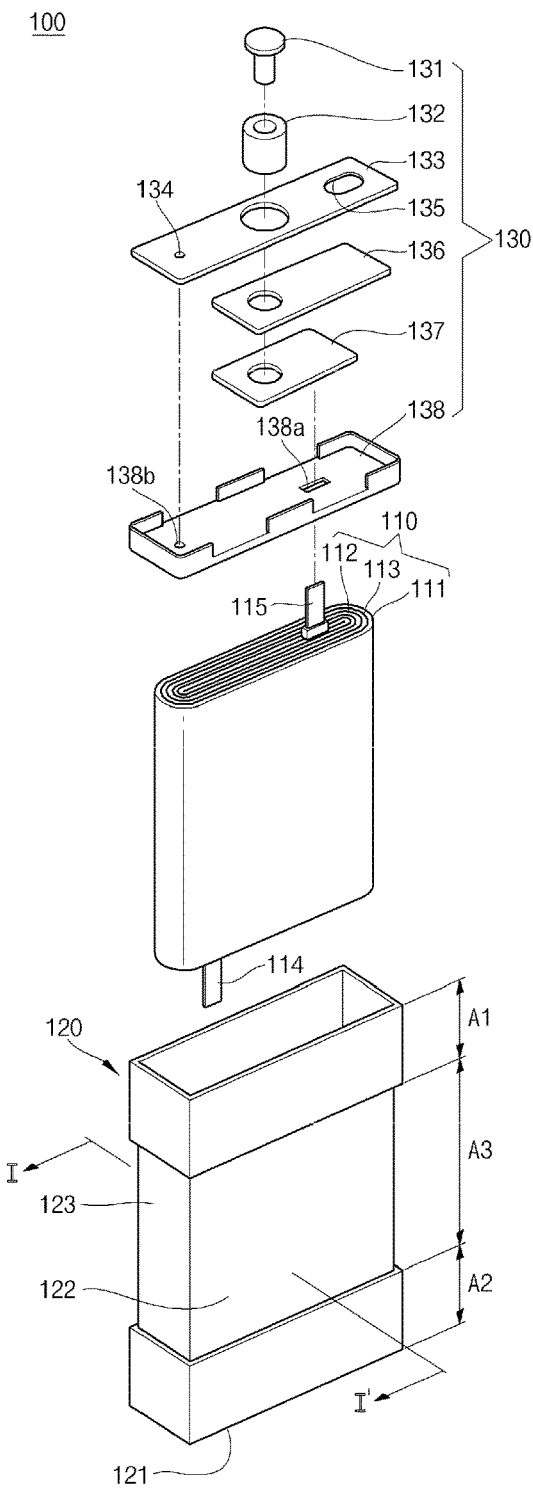
FIG. 2 is an exploded perspective view of the secondary battery illustrated in FIG. 1.
Figure 3:
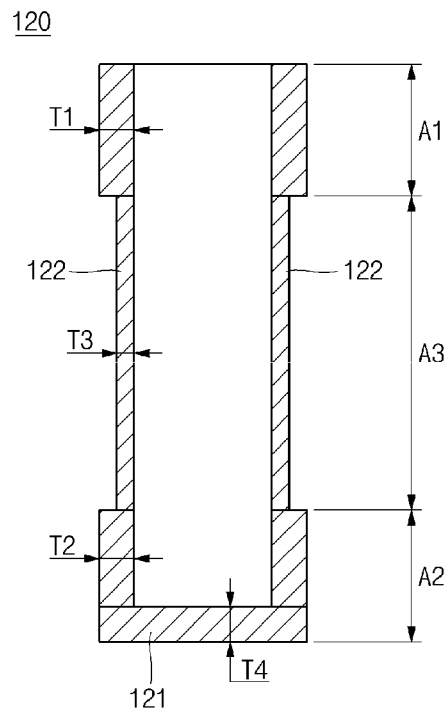
FIG. 3 is a cross-sectional view taken along the line I-I' of FIG. 2.
Figure 4:
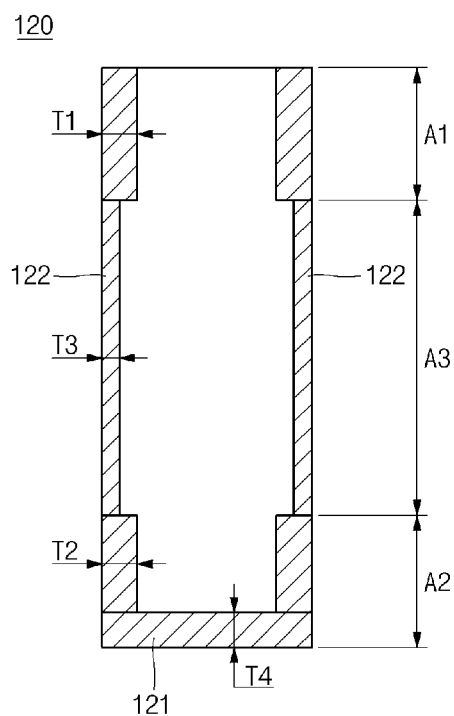
FIG. 4 is a cross-sectional view of a can according to one or more embodiments of the present invention.

FIG. 1 is a perspective view of a secondary battery according to one or more embodiments of the present invention, FIG. 2 is an exploded perspective view of the secondary battery illustrated in FIG. 1, FIG. 3 is a cross-sectional view taken along the line I-I' of FIG. 2, and FIG. 4 is a cross-sectional view of a can according to one or more embodiments of the present invention.

Referring to FIGS. 1 and 2, a secondary battery 100 according to one or more embodiments of the present invention includes an electrode assembly 110, a can 120, and a cap assembly 130.

The electrode assembly 110 includes a first electrode plate 111, a second electrode plate 112, and a separator 113 interposed between the first electrode plate 111 and the second electrode plate 112. The electrode assembly 110 may be formed by winding a stacked structure of the electrode plate 111, the separator 113, and the second electrode plate 112. In some embodiments, the first electrode plate 111 may function as a positive electrode and the second electrode plate 112 may function as a negative electrode. However, the present invention is not limited thereto.

The first electrode plate 111 may be formed by coating a first electrode active material, such as a transition metal oxide, on a first electrode collector made of a metal foil, such as aluminum (Al) or an aluminum foil. A first electrode tab 114 is attached to the first electrode plate 111. One end (e.g., a first end) of the first electrode tab 114 is connected (e.g., electrically connected) to the first electrode plate 111, and another end (e.g., a second end opposite to the first end) of the first electrode tab 114 protrudes downwardly from the electrode assembly 110. In some embodiments, the first electrode tab 114 may be connected to (e.g., electrically connected to) the can 120.

The second electrode plate 112 may be formed by coating a second electrode active material, such as graphite or carbon, on a second electrode collector made of a metal foil, such as a copper (Cu) foil or a nickel (Ni) foil. A second electrode tab 115 is attached to the second electrode plate 112. One end (e.g., a first end) of the second electrode tab 115 is connected (e.g., electrically connected) to the second electrode plate 112, and another end (e.g., a second end opposite to the first end) of the second electrode tab 115 protrudes upwardly from the electrode assembly 110.

The separator 113 may be between (e.g., may be positioned between) the first electrode plate 111 and the second electrode plate 112 to prevent electrical short circuits therebetween and to allow movement of lithium ions. The separator 113 may include (e.g., may be made of) polyethylene, polypropylene, or a composite film including polypropylene and/or polyethylene.

The electrode assembly 110 is accommodated in the can 120 together with an electrolyte. The electrolyte may include a mixture containing a lithium salt, such as lithium hexafluorophosphate ($LiPF_6$) or lithium tetrafluoroborate ($LiBF_4$) dissolved in an organic solvent, such as ethylene carbonate (EC), propylene carbonate (PC), diethyl carbonate (DEC), ethyl methyl carbonate (EMC), and/or dimethyl carbonate (DMC). In addition, the electrolyte may exist in a liquid, solid, or gel phase.

The can 120 has a substantially hexahedral shape having an opening through which the electrode assembly 110 is inserted and positioned. The can 120 has a bottom surface 121, a pair of long side surfaces 122 upwardly protruding from the bottom surface 121 and having relatively large areas, and a pair of short side surfaces 123 upwardly protruding from the bottom surface 121 and having relatively small areas. The can 120 is made of a conductive metal, such as aluminum, an aluminum alloy, or nickel plated steel. In addition, when the first electrode tab 114 is electrically connected to the can 120, the can 120 may function as a positive electrode. However, the present invention is not limited thereto.

During a drop or collision test from among various performance tests of the secondary battery 100, a force applied to the can 120 may be concentrated at top and bottom ends of the can 120 rather than at a central (or middle) portion the can 120. Therefore, according to one or more embodiments of the present invention, the top and bottom ends of the can 120 respectively have greater thicknesses than the middle portion of the can 120, thereby providing a structure capable of reducing (or minimizing) deformation of the can 120 during the drop or collision test of the secondary battery 100. The structure of the can 120 is described below in more detail.

The cap assembly 130 is located (or positioned) on the electrode assembly 110 and is coupled to the can 120 at the opening to seal the can 120. The cap assembly 130 includes an electrode terminal 131, a gasket 132, a cap plate 133, an insulation plate 136, a terminal plate 137, and an insulation case 138. The gasket 132 is located (or inserted) between the electrode terminal 131 and the cap plate 133, and the electrode terminal 131 and the terminal plate 137 are electrically connected to each other. The insulation plate 136 insulates the cap plate 133 and the terminal plate 137 from each other. An electrolyte injection opening (e.g., an electrolyte injection hole) 134 is defined in one side of the cap plate 133. After an electrolyte is injected into the can 120 through the electrolyte injection opening 134, a plug is installed to seal the electrolyte injection opening 134. In addition, a safety vent 135 is formed at an opposite side of the cap plate 133. The safety vent 135 is formed to be thinner than the cap plate 133. In other words, a thickness of the safety vent 135 is less than a thickness of the cap plate 133. If an internal pressure of the can 120 exceeds an operating pressure of the safety vent 135, the safety vent 135 opens to release gases. The insulation case 138 is located at the opening of the can 120 to seal the can 120. The insulation case 138 includes a polymer resin having an insulating property and may be made of polypropylene (PP). An opening (e.g., a hole) 138a is defined in the insulation case 138 to allow the second electrode tab 115 to pass therethrough. In addition, an electrolyte opening (e.g., an electrolyte passing hole) 138b is defined in the insulation case 138 so as correspond to the electrolyte injection opening 134.

The structure of the can 120 is described in more detail below with reference to FIGS. 2 and 3.

The can 120 may be divided into three regions along a height direction thereof. According to one or more embodiments of the present invention, the three regions are defined as a first region A1, a second region A2, and a third region A3. In one embodiment, the first region A1 is defined as an upper portion of the can 120, also referred to herein as a top end, the second region A2 is defined as a lower portion of the can 120, also referred to herein as a bottom end, and the third region A3 is defined as a central (or middle) portion of the can 120 between the first region A1 and the second region A2.

A first thickness T1 of the top end and a second thickness T2 of the bottom end are larger than a third thickness T3 of the middle portion. As described above, during the drop or collision test of the secondary battery 100, deformation of the top and bottom ends A1 and A2 of the can 120 is more severe than deformation of the middle portion A3. In other words, in one or more embodiments of the present invention, the can 120 is formed such that the first and second thicknesses T1 and T2 of the top and bottom ends A1 and A2 are greater than the thickness T3 of the middle portion A3, thereby reducing or minimizing deformation of the can 120 during the drop or collision test of the secondary battery 100.

In addition, in the can 120, the first thickness T1 of the top end A1 may be equal to the second thickness T2 of the bottom end (i.e., T1=T2). For example, the first and second thicknesses T1 and T2 of the top and bottom ends A1 and A2 may be in a range of about 0.6 mm to about 0.8 mm. When the first and second thicknesses T1 and T2 of the top and bottom ends A1 and A2 are smaller than about 0.6 mm, the can 120 is prone to deformation during the drop or collision test of the secondary battery 100. In addition, the can 120 may be formed by folding a metal board (e.g., a metal sheet). When the first and second thicknesses T1 and T2 of the top and bottom ends A1 and A2 are greater than about 0.8 mm, the metal board may not be readily folded, making it difficult to form the can 120. In addition, the third thickness T3 of the middle portion A3 may be in a range of about 0.3 mm to about 0.6 mm. In some embodiments, the first thickness T1 of the top end A1 and the second thickness T2 of the bottom end A2 may be different from each other (i.e., T1≠T2). In some embodiments, the can 120 may be formed by welding metal boards having different thicknesses. The method of forming the can 120 according to one or more exemplary embodiments is described below in more detail.

The bottom end A2 includes a bottom surface 121 of the can 120. In some embodiments, a fourth thickness T4 of the bottom surface 121 may be equal to the second thickness T2 of the bottom end A2 (i.e., T2=T4). The first electrode tab 114 of the electrode assembly 110 may be welded (e.g., directly welded) to the bottom surface 121. Therefore, the fourth thickness T4 of the bottom surface 121 may be relatively large, thereby increasing heat radiation efficiency.

Further, as illustrated in FIG. 3, the top end A1 and the bottom end A2 may protrude outwardly from the can 120. In some embodiments, as illustrated in FIG. 4, the top end A1 and the bottom end A2 may protrude into the can 120.

As described above, in the secondary battery 100 according to one or more embodiments of the present invention, the can 120 is formed such that the first and second thicknesses T1 and T2 of the top and bottom ends A1 and A2 are greater than the third thickness T3 of the middle portion A3, thereby improving the heat radiation efficiency while reducing or minimizing deformation of the can 120 during the drop or collision test of the secondary battery 100.

FIGS. 5A-5E are schematic views illustrating a method of fabricating a secondary battery according to one or more embodiments of the present invention.

The method of fabricating a secondary battery according to one or more embodiments of the present invention includes forming a can, inserting an electrode assembly into the can, and coupling a cap assembly to a top portion of the can.

Figure 5A:
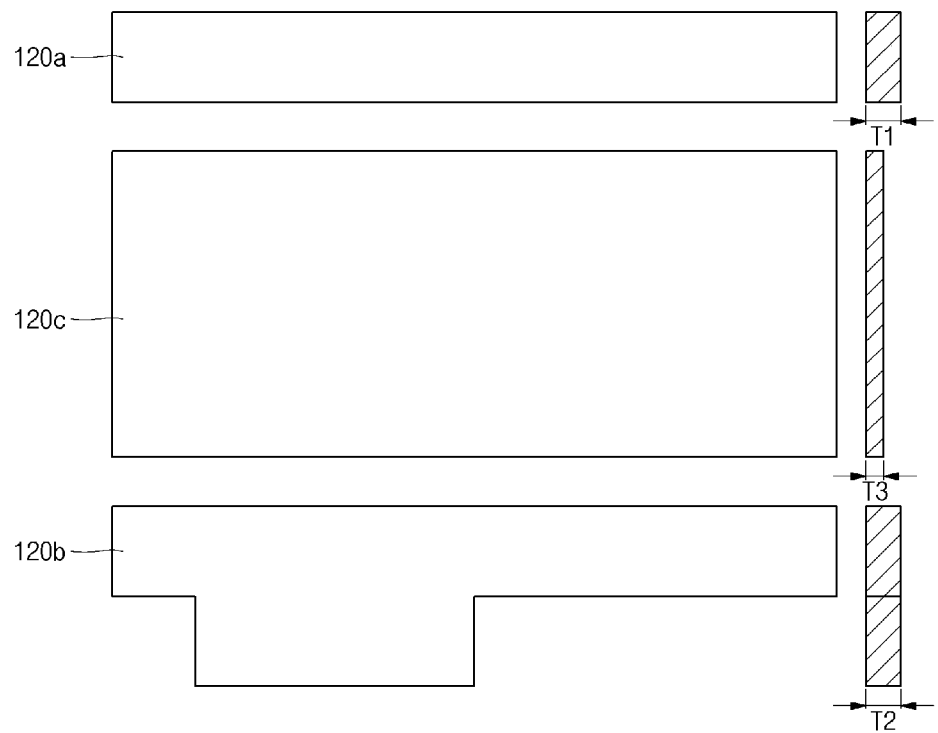
FIGS. 5A-5E are schematic views illustrating a method of fabricating a secondary battery according to one or more embodiments of the present invention.

First, as illustrated in FIG. 5A, to form the can, a first metal board 120a having a first thickness T1, a second metal board 120b having a second thickness T2, and a third metal board 120c having a third thickness T3 are prepared. In some embodiments, the first thickness T1 of the first metal board 120a and the second thickness T2 of the second metal board 120b may be equal to each other (i.e., T1=T2), and the third thickness T3 of the third metal board 120c may be less than the first and second thicknesses T1 and T2 of the first and second metal boards 120a and 120b (i.e., T3<T1=T2). In addition, the first metal board 120a, the second metal board 120b, and the third metal board 120c are cut according to (e.g., to conform to) the shape of the can 120. In some embodiments, the first metal board 120a, the second metal board 120b, and the third metal board 120c may be welded to one another and then cut according to the shape of the can 120. The first metal board 120a, the second metal board 120b, and the third metal board 120c may be made of a conductive metal, such as aluminum, an aluminum alloy, or nickel plated steel.

Figure 5B:
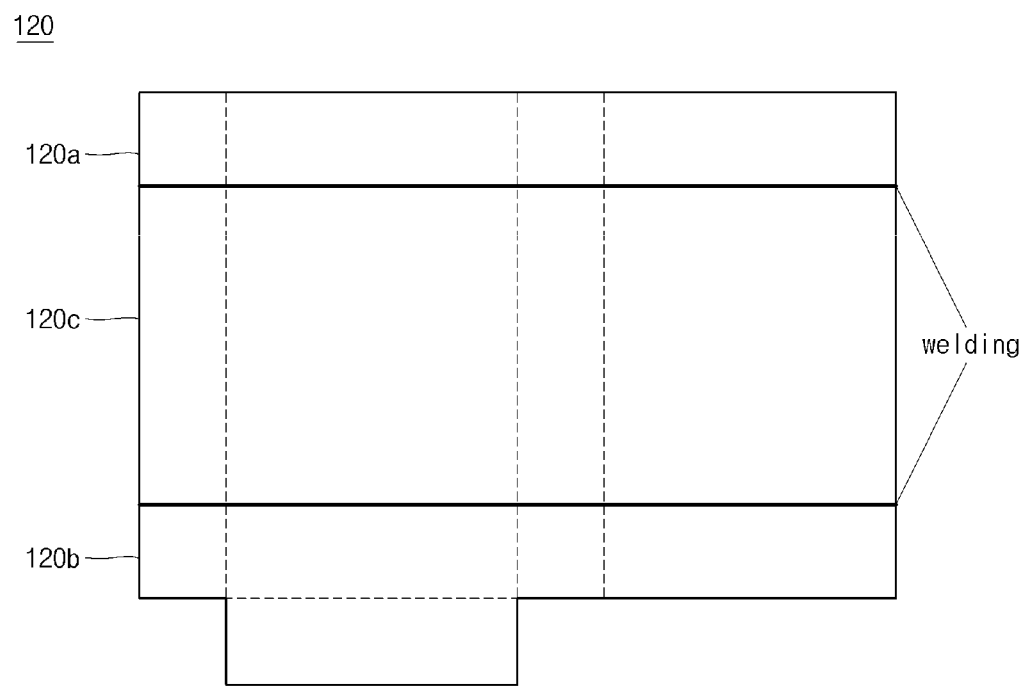
Figure 5C:
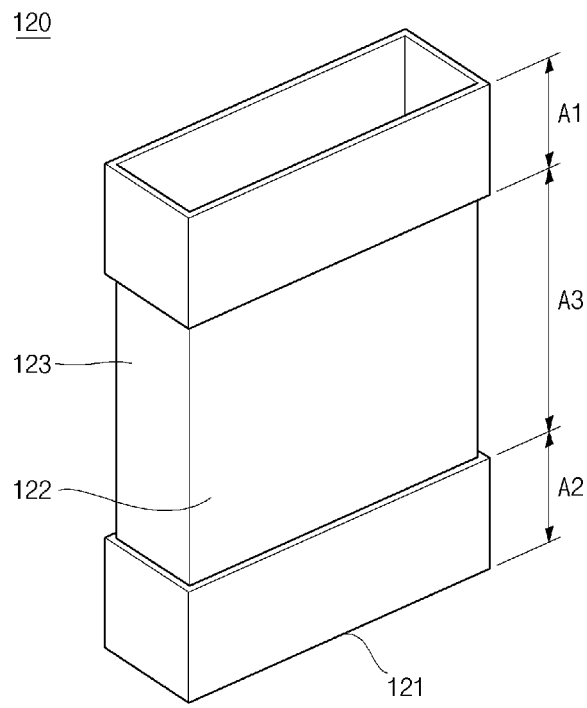

Next, as illustrated in FIG. 5B, the first metal board 120a, the second metal board 120b, and the third metal board 120c are connected to one another by welding to form a single (or unitary) metal board. In one embodiment, the welding of the metal boards having different thicknesses may be performed using tailor welded blank (TWB) technology. The welding is performed in a state in which the third metal board 120c is positioned between the first metal board 120a and the second metal board 120b. Then, the metal boards are welded into one single unit (or a unitary metal board), are folded along the dotted lines shown in FIG. 5B, and connected end portions resulting from the folding (e.g., end portions of the unitary metal board that are brought into contact with each other by folding are welded to each other), thereby completing the can 120 (see FIG. 5C). The can 120 has a bottom surface 121, a pair of long side surfaces 122 upwardly protruding from the bottom surface 121 and having relatively large areas, and a pair of short side surfaces 123 upwardly protruding from the bottom surface 121 and having relatively small areas.

While the bottom surface 121 of the can 120 is illustrated as being integrally formed with the second metal board 120b, in some embodiments, the bottom surface 121 may be a separate component from the second metal board 120b and may have a thickness that is different from that of the second metal board 120b. As such, the bottom surface 121 may be connected to the can 120 by, for example, a separate welding process.

Figure 5D:
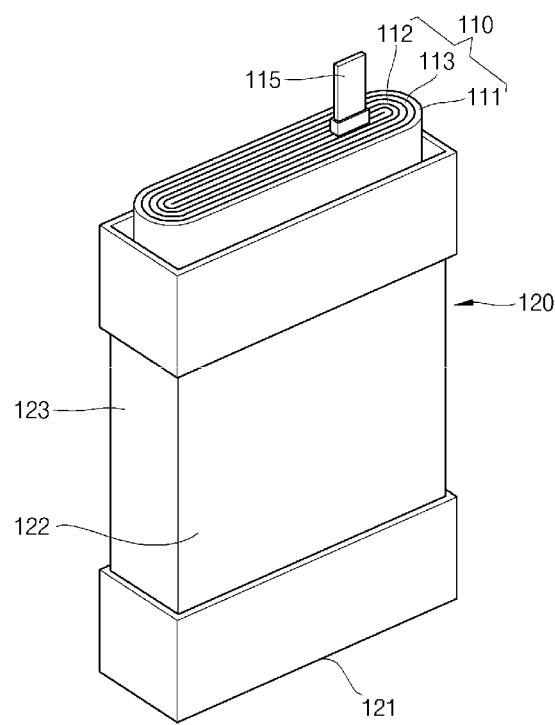
Figure 5E:
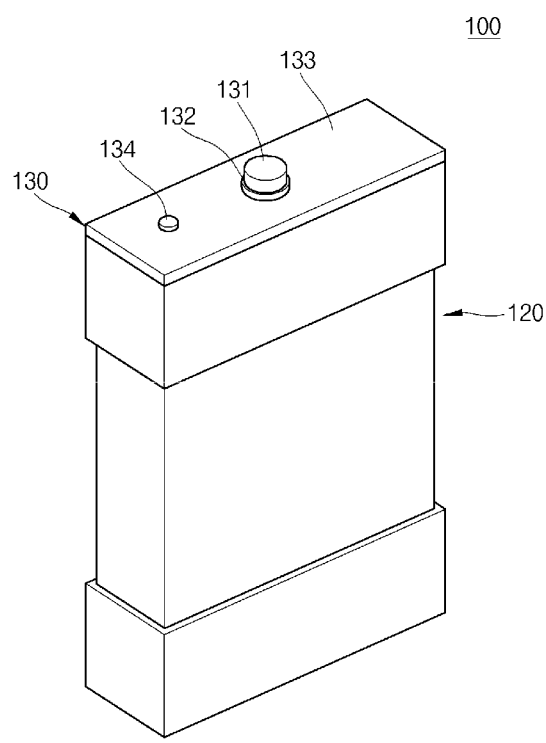

As illustrated in FIG. 5D, during the inserting of the electrode assembly 110, the electrode assembly 110 is inserted into the can 120. Then, as illustrated in FIG. 5E, during the coupling of the cap assembly 130, the cap assembly 130 is coupled to a top portion of the can 120 having the electrode assembly 110 inserted therein. The electrode assembly 110 and the cap assembly 130 are the same or substantially the same as those described above, and detailed descriptions thereof may be omitted.

As described above, in the method of fabricating the secondary battery 100 according to one or more embodiments of the present invention, metal boards having different thicknesses are welded to one another and are then folded to form the can 120. Therefore, the method of fabricating the secondary battery according to one or more embodiments of the present invention may facilitate formation of the can 120 and can reduce or minimize deformation of the can 120 during a drop or collision test by forming the can 120 have different strengths at different regions.

While the secondary battery and the method of fabricating thereof according to the present invention have been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A secondary battery comprising:
   an electrode assembly comprising:
      a first electrode plate;
      a second electrode plate; and
      a separator between the first electrode plate and the second electrode plate;
   a can accommodating the electrode assembly, the can comprising metal boards having different thicknesses, the metal boards being welded together to form a unitary metal board; and
   a cap assembly coupled to and sealing the can,
   wherein a top end and a bottom end of the can each have a thickness that is greater than a thickness of a middle portion of the can,
   wherein the unitary metal board is folded, and
   wherein end portions of the unitary metal board are welded together.

2. The secondary battery of claim 1, further comprising a first electrode tab electrically connected to the first electrode plate and downwardly protruding from the electrode assembly,
   wherein the first electrode tab is welded to a bottom surface of the can.

3. The secondary battery of claim 1, wherein a thickness of a bottom surface of the can is greater than the thickness of the middle portion of the can.

4. A method of fabricating a secondary battery, the method comprising:
   forming a can having a top end and a bottom end having respective thicknesses that are greater than a thickness of a middle portion of the can, the top end being welded to the middle portion;
   inserting an electrode assembly into the can, the electrode assembly comprising:
      a first electrode plate;
      a second electrode plate; and
      a separator between the first electrode plate and the second electrode plate; and
   coupling a cap assembly to the can.

5. The method of claim 4, wherein the forming of the can comprises welding a first metal board having a first thickness, a second metal board having a second thickness, and a third metal board having a third thickness to each other to form a unitary metal board.

6. The method of claim 5, wherein the forming of the can further comprises:
   folding the unitary metal board; and
   welding end portions of the unitary metal board that are adjacent to each other after folding.

7. The method of claim 5, wherein the first thickness of the first metal board is the same as the second thickness of the second metal board, and
   wherein the third thickness of the third metal board is less than the first and second thicknesses.

8. The method of claim 5, wherein the third metal board is arranged between the first metal board and the second metal board.

9. The method of claim 4, further comprising welding a first electrode tab to a bottom surface of the can,
   wherein the first electrode tab is electrically connected to the first electrode plate and protrudes downwardly from the electrode assembly.

* * * * *